US007812588B1

(12) United States Patent
Soh et al.

(10) Patent No.: US 7,812,588 B1
(45) Date of Patent: Oct. 12, 2010

(54) OUTPUT VOLTAGE ADAPTIVE VOLTAGE CONVERTING APPARATUS AND METHOD THEREOF

(75) Inventors: Seul Yi Soh, Gyeonggi-do (KR); Myung Jin Soh, Gyeonggi-do (KR)

(73) Assignee: Luxen Technologies, Inc., Seoul (KR)

( * ) Notice: Subject to any disclaimer, the term of this patent is extended or adjusted under 35 U.S.C. 154(b) by 0 days.

(21) Appl. No.: 12/441,410

(22) PCT Filed: Nov. 26, 2008

(86) PCT No.: PCT/KR2008/006954

§ 371 (c)(1),
(2), (4) Date: Feb. 23, 2010

(87) PCT Pub. No.: WO2009/069932

PCT Pub. Date: Jun. 4, 2009

(30) Foreign Application Priority Data

Nov. 26, 2007 (KR) ...................... 10-2007-0120914

(51) Int. Cl.
*G05F 1/40* (2006.01)
(52) U.S. Cl. .................................................... 323/351
(58) Field of Classification Search ................. 323/224, 323/313, 314, 265, 282, 283, 349, 350, 351
See application file for complete search history.

(56) References Cited

U.S. PATENT DOCUMENTS

| | | | | |
|---|---|---|---|---|
| 5,552,694 A | * | 9/1996 | Appeltans | ................... 323/222 |
| 5,675,240 A | * | 10/1997 | Fujisawa et al. | ............. 323/282 |
| 5,748,457 A | * | 5/1998 | Poon et al. | ..................... 363/16 |
| 5,959,441 A | * | 9/1999 | Brown | ......................... 323/282 |
| 6,348,779 B1 | * | 2/2002 | Sluijs | ......................... 323/222 |
| 7,109,692 B1 | * | 9/2006 | Wu et al. | ..................... 323/282 |
| 7,161,335 B2 | * | 1/2007 | Wei et al. | ..................... 323/266 |
| 7,301,312 B2 | * | 11/2007 | Nishino | ...................... 323/222 |
| 7,327,185 B2 | * | 2/2008 | Mair et al. | ................... 327/540 |
| 7,560,917 B2 | * | 7/2009 | Ho et al. | ...................... 323/285 |
| 2006/0049815 A1 | * | 3/2006 | Ho et al. | ...................... 323/282 |

FOREIGN PATENT DOCUMENTS

WO      WO 03/062972 A2  *  7/2003

* cited by examiner

*Primary Examiner*—Adolf Berhane
(74) *Attorney, Agent, or Firm*—LRK Patent Law Firm

(57) ABSTRACT

The present invention is related to, in general, an output voltage adaptive converting apparatus and method thereof. The invention provides an output voltage adaptive voltage converting apparatus, comprising a clock generating unit that generates predetermined clock signals; a switching amplifying unit that amplifies an input voltage ($V_i$) and produces an output voltage ($V_o$) based on the clock signals; a feedback filtering unit that filters the output voltage ($V_o$) and produces a filtered voltage ($V_{OB}$); a voltage comparing unit that compares the filtered voltage ($V_{OB}$) with the input voltage ($V_i$) and produces a control voltage ($V_c$); and a voltage switching unit that connects a source voltage ($V_{dd}$) of the clock generating unit to the input voltage ($V_i$) or the filtered voltage ($V_{OB}$) based on the control voltage ($V_c$).

17 Claims, 4 Drawing Sheets

[Fig. 1]
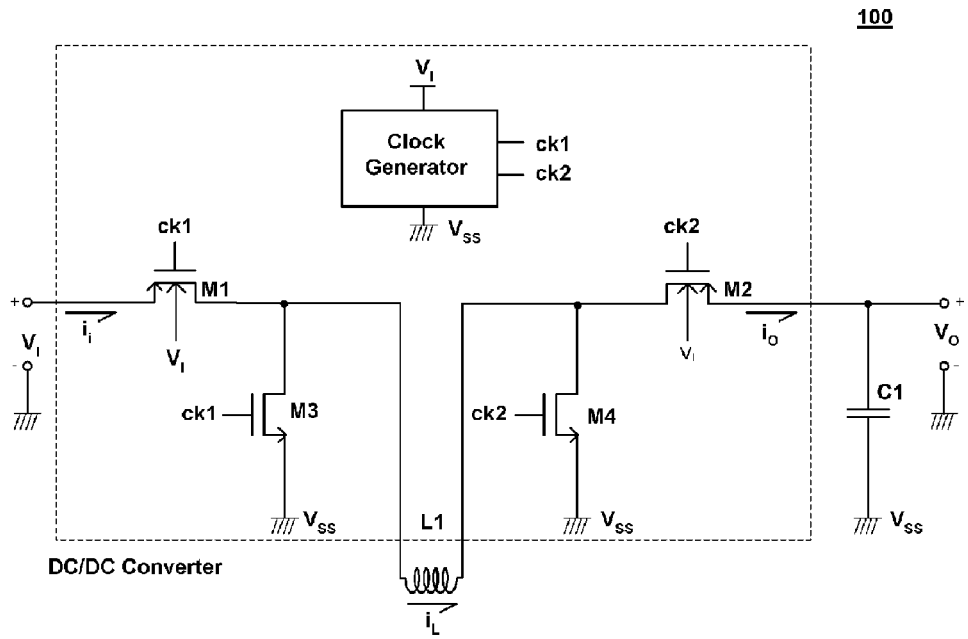
[Fig. 2]
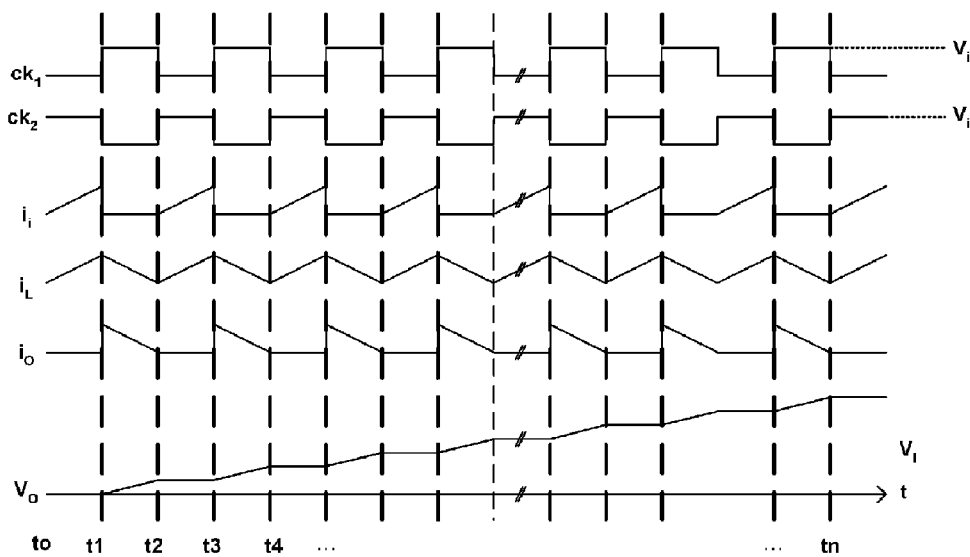

[Fig. 3]
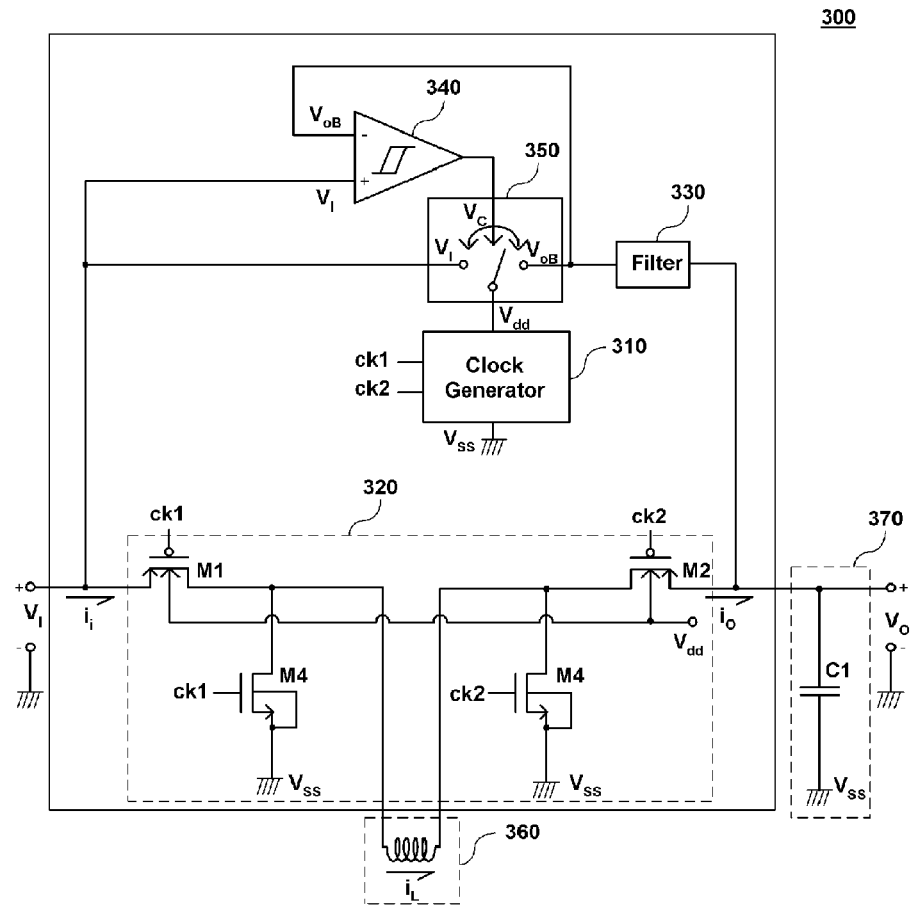
[Fig. 4]
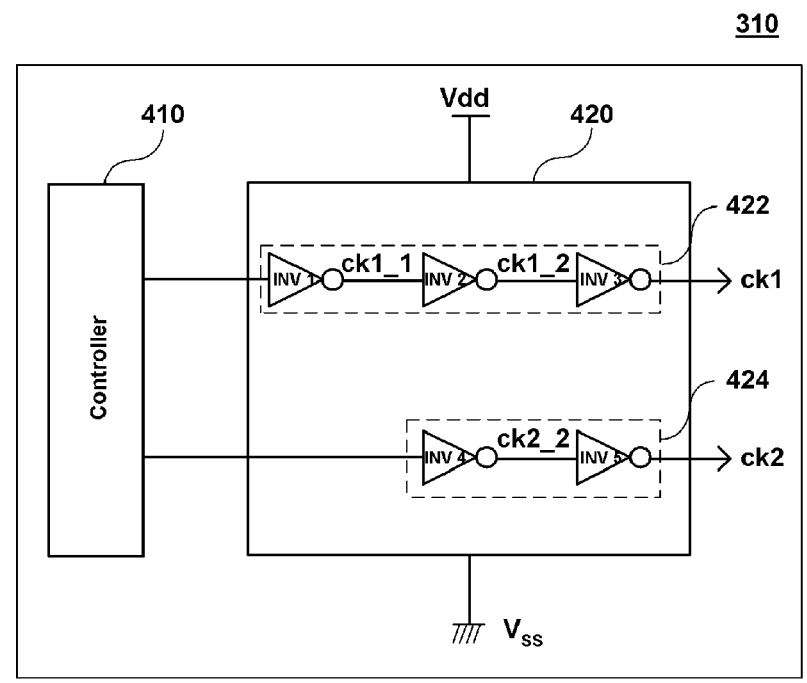

[Fig. 5]
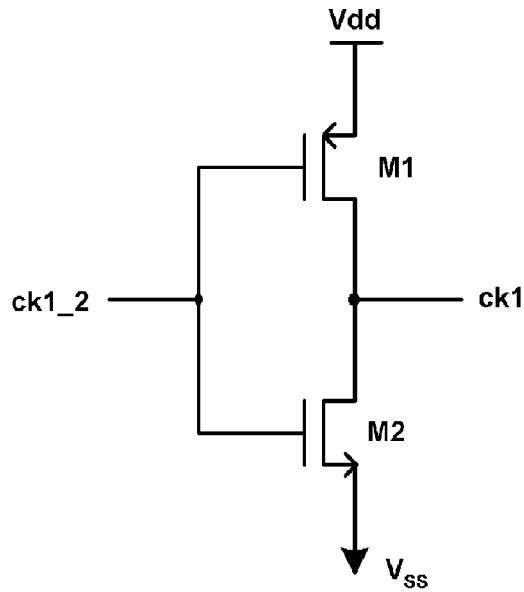
Example of INV3
[Fig. 6]
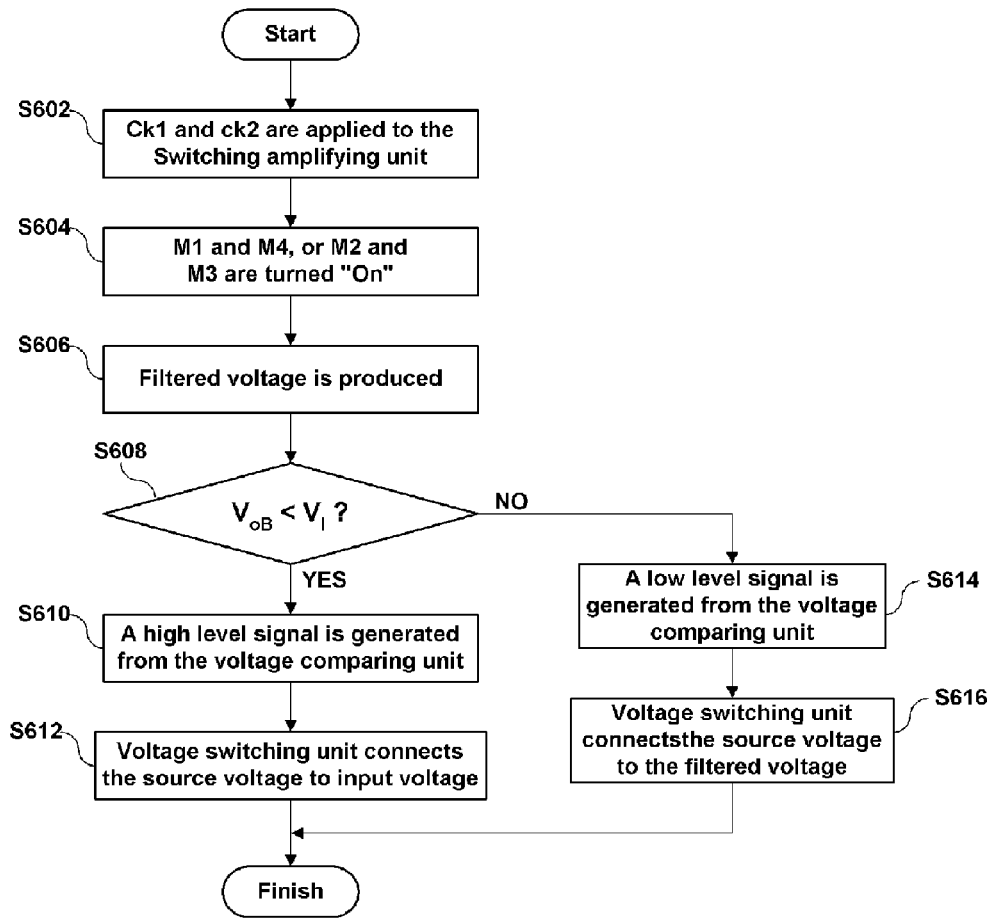

[Fig. 7]
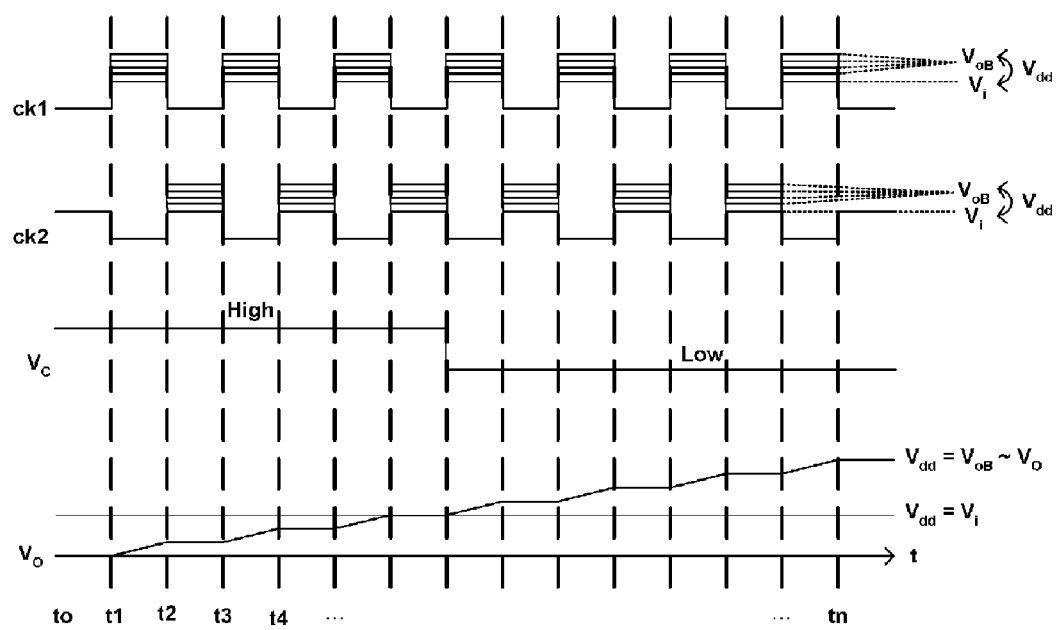

OUTPUT VOLTAGE ADAPTIVE VOLTAGE CONVERTING APPARATUS AND METHOD THEREOF

TECHNICAL FIELD

The present invention is related to, in general, an output voltage adaptive converting apparatus and method thereof, and more precisely, about a DC to DC voltage converter with a mechanism that compares an input voltage to a DC filtered voltage obtained by a buck-boost DC to DC converter, and connects the input voltage to a clock generating unit and a switching device if the said input voltage is greater than the said output voltage, or connects the output voltage to the clock generating unit and a switching device if the said output voltage is greater than the said input voltage in order to maintain the fixed operating voltage throughout the clock generating unit and the switching device so that they can operate stably.

BACKGROUND ART

In general, switching transistors of buck-boost DC to DC converter as an integrated circuits that pump out higher output voltage than the input voltage cannot operate properly because the switching transistors fail to do ON and OFF die to the greater output voltage than supply voltage in the integrated circuits.

In case of CMOS transistors, because a gate voltage determines ON or OFF, a PMOS gate turns on the when its voltage is smaller than a source voltage, and the gate turns off when its voltage is larger than a source voltage, the PMOS transistor's gate requires to maintain a voltage that is smaller than its source voltage, or greater than its source voltage.

FIG. 1 is a schematic of a classic DC/DC converter.

In the FIG. 1, a clock generating unit (110) generates clock signals ck1 and ck2; PMOS transistors M1 and M2 turn themselves on when the clock signals ck1 and ck2 are both low, and turn off when the signals ck1 and ck2 are both high.

On the other hand, NMOS transistors M3 and M4 turn themselves on when ck1 and ck2 are both high, and turn off when the both signals are low. Therefore, if the said clock signal ck1 is low, and ck2 is high, then the transistors M1 and M4 turn on, and current $i_i$ flows from an input voltage $V_i$ through the transistor M1, an indictor L1, and the transistor M4, charging the indictor in the process.

When the clock signals ck1 is high and ck2 is low, the transistors M2 and M3 turn on, making a circuit consist of the transistors M2 and M3, the indictor L1, and a capacitor C1. The charges within the indictor then go through the transistor M2, ultimately stored in the capacitor C1. By charging up the capacitor C1, an output voltage Vo gradually increases.

Repeated this process and it would continually increase the output voltage $V_o$ if there are no current consuming loads attached.

Yet, source voltage of the DC/DC converter in the FIG. 1 is fixed to $V_i$, setting the maximum values of clock signals ck1 and ck2 can take. These clock signals go to gates of the transistors M1, M2, M3, and M4 separately. FIG. 2 is a graph of clock signals, input voltage, output current, and output voltage of a classic DC/DC voltage converter.

After a certain amount of time, when an output voltage Vo becomes greater than an input voltage $V_i$ as FIG. 2 shows, the source voltage of the transistor M2 gets greater than maximum value of the clock signal ck2 that goes into the gate of the transistor M2, resulting in the transistor M2's failure in turning itself off even when the signal ck2 is high.

A greater source voltage than the gate voltage within the transistor M2 means that it is unavailable to control the transistor with the clock signals, eventually making it impossible to function as a boost DC/DC voltage converter.

Currently used method to solve such problem stated above is to add within a DC/DC converter a DC voltage amplifier that boosts up $V_i$, and uses an output voltage of the DC voltage amplifier $V_{dd}$ as a reference in producing clock signals ck1 and ck2. To ensure proper operations of transistors, these high clock signals ck1 and ck2 are set to have higher value than an expected maximum value of the output voltage $V_o$. And yet, such a mechanism requires a DC voltage amplifier within a boost DC/Dc converter, plus the clock signals ck1 and ck2 can become unnecessarily huge even when an output voltage is small.

DISCLOSURE OF INVENTION

Technical Problem

To avoid those problems in the switching transistors, we filter out the output voltage and compare it to the input voltage and guarantee the clock generating unit and switching mechanism to work by substituting the clock generating unit's power voltage to the filtered voltage when it is greater than the input voltage; substituting the clock generating unit's voltage to the power voltage when the filtered voltage is smaller than the input voltage.

Technical Solution

The present invention provides an output voltage adaptive voltage converting apparatus, comprising a clock generating unit that generates predetermined clock signals; a switching amplifying unit that amplifies an input voltage ($V_i$) and produces an output voltage ($V_o$) based on the clock signals; a feedback filtering unit that filters the output voltage ($V_o$) and produces a filtered voltage ($V_{OB}$); a voltage comparing unit that compares the filtered voltage ($V_{OB}$) with the input voltage ($V_i$) and produces a control voltage ($V_c$); and a voltage switching unit that connects a source voltage ($V_{dd}$) of the clock generating unit to the input voltage ($V_i$) or the filtered voltage ($V_{OB}$) based on the control voltage ($V_c$).

Preferably, a charge storing unit that stores charges of a voltage which is amplified by the switching amplifying unit; and a leveling unit that levels out the output voltage ($V_o$) of the switching amplifying unit.

Preferably, the switching amplifying unit comprises a switch that turns on or off based on the clock signals.

Preferably, the switching amplifying unit comprises a first switch (M1) comprising a P-type MOSFET, a second switch (M2) comprising a P-type MOSFET, a third switch (M3) comprising a N-type MOSFET and a fourth switch (M4) comprising a N-type MOSFET, the charge storing unit is connected between the first switch (M1) and the second switch (M2), a source of the first switch (M1) is connected to the input voltage ($V_i$), a drain of the first switch (M1) is connected to both the drain of the third switch (M3) and one end of an inductor (L1) of the charge storing unit, a source and body of the third switch (M3) are connected to a ground ($V_{ss}$), a gate of the first switch (M1) and a gate of the third switch (M3) are connected to a first clock (CK1) of the clock generating unit, the other end of the inductor (L1) of the charge storing unit is connected to both a drain of the second switch (M2) and a drain of the fourth switch (M4), a source and body of the fourth switch (M4) are connected to the ground ($V_{ss}$), a source of the second switch (M2) is connected to both the output voltage ($V_o$) and one end of a capacitor (C1) of the leveling unit, the other end of the capacitor (C1) of the leveling unit is connected to the ground ($V_{ss}$), a body of the first switch (M1) and a body of the second switch are connected to the source voltage ($V_{dd}$), and a gate of the second switch (M2) and a gate of the fourth switch (M4) are connected to a second clock (CK2) of the clock generating unit.

Preferably, if the filtered voltage ($V_{OB}$) is smaller than the input voltage ($V_i$), the voltage comparing unit produces a high level control voltage.

Preferably, if the filtered voltage ($V_{OB}$) is greater than the input voltage ($V_i$), the voltage comparing unit produces a low level control voltage.

Preferably, the voltage switching unit connects the source voltage ($V_{dd}$) to the input voltage ($V_i$) when the control voltage ($V_c$) is a high level signal.

Preferably, the voltage switching unit connects the source voltage ($V_{dd}$) to the filtered voltage ($V_{OB}$) when the control voltage ($V_c$) is a low level signal.

Preferably, the first switch (M1) and the fourth switch (M4) are turned "ON", and the second switch (M2) and the third switch (M3) are turned "OFF" when the first clock signal (CK1) is a low level signal and the second clock signal (CK2) is a high level signal.

Preferably, the second switch (M2) and the third switch (M3) are turned "ON", and the first switch (M1) and the fourth switch (M4) are turned "OFF" when the first clock signal (CK1) is a high level signal and the second clock signal (CK2) is a low level signal.

The present invention also provides an output voltage adaptive voltage converting method, comprising the steps of: (a) applying, by a clock generation unit, the first clock signal (CK1) and the second clock signal (CK2) to a switching amplifying unit; (b) amplifying, by the switching amplifying unit, an input voltage ($V_i$) and producing a output voltage ($V_o$) based on the first clock signal (CK1) and the second clock signal (CK2); (c) filtering, by a feedback filtering unit, the output voltage ($V_o$) and producing a filtered voltage ($V_{OB}$); (d) comparing, by a voltage comparing unit, the filtered voltage ($V_{OB}$) with the input voltage ($V_i$) and producing a control voltage ($V_c$); and (e) connecting, by a voltage switching unit, a source voltage ($V_{dd}$) of the clock generating unit to the input voltage ($V_i$) or the filtered voltage ($V_{OB}$) based on the control voltage ($V_c$).

Preferably, at the step (d), if the filtered voltage ($V_{OB}$) is smaller than the input voltage ($V_i$), the voltage comparing unit produces a high level control voltage.

Preferably, at the step (d), if the filtered voltage ($V_{OB}$) is greater than the input voltage ($V_i$), the voltage comparing unit produces a low level control voltage.

Preferably, at the step (e), the voltage switching unit connects the source voltage ($V_{dd}$) to the input voltage ($V_i$) when the control voltage ($V_c$) is a high level signal.

Preferably, at the step (e), the voltage switching unit connects the source voltage ($V_{dd}$) to the filtered voltage ($V_{OB}$) when the control voltage ($V_c$) is a low level signal.

Preferably, a first switch (M1) and a fourth switch (M4) of the switching amplifying unit are turned "ON", and a second switch (M2) and a third switch (M3) of the switching amplifying unit are turned "OFF", when the first clock signal (CK1) is a low level signal and the second clock signal (CK2) is a high level signal.

Preferably, a second switch (M2) and a third switch (M3) of the switching amplifying unit are turned "ON", and a first switch (M1) and a fourth switch (M4) of the switching amplifying unit are turned "OFF", when the first clock signal (CK1) is a high level signal and the second clock signal (CK2) is a low level signal.

ADVANTAGEOUS EFFECTS

With the present invention, a separate booster circuit within the DC/DC converter is no longer needed, but it can achieve the same result by feed-backing the output voltage.

Also, it is possible to prevent the overload in the circuit by using a fixed voltage for the clock generating unit and PMOS transistors' body, because the output voltage ($V_o$) determines the voltage for clock generating unit and the PMOS body. They set themselves according to the changing output voltage.

Moreover, it is possible to design a boost DC/DC converter that pumps out greater output voltage from a small voltage with this output voltage adaptive DC/DC converter.

Additionally, more efficient Buck-boost DC/DC converter can be derived, for it is possible to compare and select the input and output voltages.

BRIEF DESCRIPTION OF THE DRAWINGS

FIG. 1 is a schematic of a classic DC/DC converter.

FIG. 2 is a graph of clock signal, input current, output current, and output voltage.

FIG. 3 is a schematic of an output voltage adaptive voltage converter introduced in the present invention.

FIG. 4 is a schematic of a clock generating unit of the present invention.

FIG. 5 is a schematic of an inverter.

FIG. 6 is a flow diagram showing the overall operation of an output voltage adaptive voltage converter of the present invention.

FIG. 7 is a graph of clock signal, control signal, and output voltage obtained by the present invention.

300: Output voltage adaptive voltage converter
    310: clock generating unit
    320: switching amplifying unit
    330: feedback filtering unit
    340: voltage comparing unit
    350: voltage switching unit
    360: charge storing unit
    370: leveling unit
    410: controller
    420: clock generator
    M1, M2: P type MOSFET
    M3, M4: N type MOSFET
    CK1, CK2: Clock signals
    $V_{dd}$: Source voltage
    $V_{ss}$: Ground
    L1: Inductor
    C1: Capacitor
    $V_i$: Input voltage
    $V_o$: Output voltage
    $V_c$: Control Voltage
    $V_{OB}$: Filtered voltage
    $i_i$: Input Current
    $i_o$: Output current
    INV1, INV2, INV3, INV4, INV5: Inverters

MODE FOR THE INVENTION

Now the following is an explanation of the present invention in depth. FIG. 3 is a schematic of an output voltage adaptive voltage converter and its circuitry.

As shown in the FIG. 3, the Output Voltage Adaptive Voltage Converter (300) comprises a clock generating unit (310); a switching amplifying unit (320); a feedback filtering unit (330); a voltage comparing unit (340); a voltage switching unit (350); a charge storing unit (360), and a leveling unit (370).

The clock generating unit (310) generates either high level or low level signals. The signals, CK1 and CK2 are then transmitted to the switching amplifying unit (320).

The switching amplifying unit (320) takes in the signals CK1, and CK2 from the clock generating unit (310), and switches on or off depending on the signals. The switching amplifying unit (320) amplifies an input voltage $V_i$. The switching amplifying unit (320) has switching devices such as MOSFETs that operate based on clock signals.

Feedback filtering unit (330) produces a filtered voltage $V_{OB}$ from the output voltage of the switching amplifying unit (320).

Voltage comparing unit (340) compares the filtered voltage ($V_{OB}$) with the input voltage ($V_i$) and pumps out a control voltage of either high or low level. A Schmidt trigger circuit can be used for the voltage comparing unit (340).

The voltage switching unit (350) connects a source voltage ($V_{dd}$) of the clock generating unit to either the input voltage $V_i$, or the filtered voltage ($V_{OB}$) based on the level of the control voltage ($V_c$).

The charge storing unit (360) stores charges of the output voltage of the switching amplifying unit (320). An inductor, L1 can be used as the charge storing unit (360).

The leveling unit (370) levels out the output voltage of the switching amplifying unit (320). A capacitor can be used as the leveling unit (370), and it can be placed inside, or outside of an output voltage adaptive voltage converter (300).

In the output voltage adaptive voltage converter (300) that has the characteristics described so far, a switching amplifying unit (320) comprises P type MOSFET switches of M1, and M2, as well as N type MOSFET switches of M3, and M4. A capacitor connects the first switch M1 and the second switch M2.

In the switching amplifying unit (320), an input voltage V goes to a source of the first switch (M1); a drain of the first switch (M1) is connected to a drain of the third switch (M3) as well as to one end of the inductor (L1). A source and a body of the third switch (M3) are both connected to the ground ($V_{ss}$); gates of the first and third switches (M1, M3) are connected to the clock generating unit (310)'s the first clock (CK1).

The other end of the inductor (L1) is connected to drains of both the second and forth switches (M2, M4); a source and a body of the forth switch (M4) are grounded ($V_{ss}$).

A source of the second switch (M2) is connected to an output voltage ($V_o$) as well as one end of a capacitor (C1) is connected to it. The other end of the capacitor (C1) is grounded ($V_{ss}$).

In the switching amplifying unit (320), bodies of the first and second switches (M1, M2) are both connected to the clock generating unit (310)'s source voltage pin; a second clock signal (CK2) is applied to gates of the second and forth switches (M2, M4)

The input voltage ($V_i$) is connected to a positive pin to a voltage comparing unit (340) at the same time it is connected to a voltage switching unit (350). An output voltage ($V_o$) goes to a pin of a feedback filtering unit (330) as an input and the other pin of the feedback filtering unit (330) is connected to both a filtered voltage of the voltage switching unit (350), and to a negative pin of the voltage comparing unit (340). An output from the voltage comparing unit (340) goes to the voltage switching unit (350)'s control voltage pin ($V_c$).

FIG. 4 is an example of an inner circuitry of a clock generating unit.

As shown in the FIG. 4, a clock generating unit of an output voltage adaptive voltage converter (300) is consists of a controller (410) and a clock generator (420).

The controller (410) produces control signals for generating clock signals. The controller (410) creates two different control signals: first control signal (No. 1) for the first clock signal (CK1) and second control signal (No. 2) for the second clock signal (CK2). The control signals go to the clock generating block (420).

The clock generator (420) is consists of two separate sub-generators: first sub-clock generator (422) that generates the first clock signal (CK1) based on the first control signal; second sub-clock generator (424) that generates the second clock signal (CK2) based on the second control signal.

The first sub-clock generator (422) inclines, a first inverter (INV1) that takes the first control signal from the control block (410), and inverts the signal to send out an output of a sub-signal (CK1_1); a second inverter (INV2) that takes the sub-signal (CK1_1) and invert it to generate another sub-signal (CK1_2); a third inverter (INV3) that takes the sub-signal (CK1_2) and invert it to get the first clock signal (CK1).

Therefore, when the first control signal is a high level signal, the first clock first sub-signal (CK1_1) becomes a low level signal, which leads to a high level signal of the first clock second sub-signal (CK1_2), and thus the first clock signal (CK1) becomes a low level signal. Likewise, when the first control signal is a low level signal, the first clock first sub-signal (CK1_1) becomes a high level signal, which leads to a low level signal of the first clock second sub-signal (CK1_2), and thus the first clock signal (CK1) becomes a high level signal.

On the other hand, the second sub-clock generator (424) inclines, a forth inverter (INV4) that takes the second control signal from the controller (410), and inverts the signal to send out an output of a sub-signal (CK2_1); a fifth inverter (INV5) that takes the sub-signal (CK2_1) and invert it to get the second clock signal (CK2).

Therefore, when the second control signal is a high level signal, the second clock first sub-signal (CK2_1) becomes a low level signal, which leads to a high level signal of the second clock signal (CK2). Likewise, when the second control signal is a low level signal, the second clock first sub-signal (CK2_1) becomes a high level signal, which leads to a low level signal of the second clock signal (CK2).

FIG. 5 is a schematic of an inverter's inner structure.

As shown in the FIG. 5, in an output voltage adaptive voltage converter (300), a clock generating unit (310)'s a third inverter (INV3) has a structure of a P type MOSFET (M1) connected with a N type MOSFET (M2) in series, and a first clock second sub-signal (CK1_2) being applied to an input pad, with an output pad that sends out a first clock signal (CK1).

More precisely, in the clock generating unit (310)'s the third inverter (INV3), a source of the P type MOSFET (M1) is connected to a source voltage ($V_{dd}$), and a drain of the P type MOSFET (M1) is connected to a drain of the N type MOSFET (M2) with the first clock signal (CK2) input pin is attached. A source of the N type MOSFET (M2) goes to the ground ($V_{ss}$); a first clock second sub-signal (CK1_2) is then goes to gates of the both P type MOSFET (M1) and N type MOSFET (M2).

FIG. 6 is a flow diagram that shows the operations being performed by of the present invention, and FIG. 7 is a graph of clock signals and control signals with output voltages of the present invention.

Looking at either FIG. 3 or FIG. 7, in an output voltage adaptive voltage converter (300), a first clock signal (CK1) and a second clock signal (CK2) from a clock generating unit (310) go to the a switching amplifying unit (320) (S602).

The first clock signal (CK1) from the clock generating unit (310) goes to gates of both first switch (M1) and third switch (M3) of the switching amplifying unit (320); the second clock signal (CK2) from the clock generating unit (310) goes to gates of both second switch (M2) and forth switch (M4) of the switching amplifying unit (320).

The switches M1 and M4, M2 and M3 turn on according to the clock signals (S604).

In another word, the P type MOSFET switch M1 and the N type MOSFET switch M4 in the clock generating unit (310) are turned on during t0~t1 where the first clock signal (CK1) from the switching amplifying unit (320) is a low and the second clock signal (CK2) signal is high.

During such time, an input current $i_i$ goes through the first switch M1, an inductor L1, and the forth switch M4. The current signature is shown in the FIG. 2.

On the other hand, the switches M2 and M3 are turned on while the switches M1 and M4 are turned off during t1~t2 where the first clock signal (CK1) is a high and the second clock signal (CK2) signal is low. Thus, a circuit is completed with the second switch (M2), an inductor L1, the third switch (M3), and a capacitor (C1). A current in the circuit is shown in the FIG. 2.

The present invention, an output voltage adaptive voltage converter (300) repeats the process mentioned above, and as time elapses, the stored up charges in an inductor (L1) charge a capacitor (C1) in a leveling unit (370). The output voltage ($V_o$) increases as shown in the FIG. 7. If all of the switches (M1, M2, M3, M4), indictor (L1), and capacitor (C1) are ideal devices and there is no wasted current or power loss in the output voltage.

The input voltage $V_i$ is applied to the positive pins of the both voltage switching unit (350) and voltage comparing unit (340) of a Schmitt-trigger, and the output voltage ($V_o$) from the switching amplifying unit (320) is applied to the feedback filtering unit (330) where the input voltage is filtered and leveled, and come out as an output of $V_{OB}$ (S606). The output voltage $V_{OB}$ goes to the negative pins of the both voltage switching unit (340) and voltage comparing unit (340).

The voltage comparing unit (340) compares the filtered voltage $V_{OB}$ to the input voltage $V_i$, and if $V_{OB}$ is less than $V_i$ (S608-YES), the voltage comparing unit generates high level control signal $V_c$ (S610) such as the one that appears in the FIG. 7, and the high level control signal $V_c$ is applied to the voltage switching unit (350) where the source voltage $V_{dd}$ is switch connected to the input voltage $V_i$ (S612) based on the high level control signal $V_c$.

On the other hand, the voltage comparing unit (340) compares the filtered voltage $V_{OB}$ to the input voltage $V_i$, and if $V_{OB}$ is greater than $V_i$ (S608-NO), the voltage comparing unit generates low level control signal $V_c$ (S614) such as the one that appears in the FIG. 7, and the high level control signal $V_c$ is applied to the voltage switching unit (350) where the source voltage $V_{dd}$ is switch connected to the input voltage $V_{OB}$ (S616) based on the low level control signal $V_c$.

The voltage comparing unit (340) generates low level control signal $V_c$ when the filtered voltage $V_{OB}$ from the feedback filtering unit (330) is greater than the input voltage $V_i$. The properties of a Schmitt-trigger enable the control voltage $V_c$ to maintain its original status if the differences between the filtered voltage $V_{OB}$ and the input voltage $V_i$ is within a certain bound.

A Schmitt-trigger circuit has two stable states, which makes it ideal for producing waves with two different operational properties much like a double-stable multi-vibrator does. A Schmitt-trigger circuit is very sensitive to its inputs, and operates at a low trigger point where a trigger signal is an AC voltage that changes in time. An input signal is similar to a changing sine-wave, and output takes one of the two states of high and low.

Two transistors can make of a Schmitt-trigger. One of the transistors (TR1) is turned off, the other one (TR2) is disabled. When there is no input signal, TR1 is turned off, and TR2 becomes saturated and disabled for the collector voltage of the transistor TR1 gets divided into two separate resistant that loads a base of the other transistor TR2. When high input voltage is applied, then the transistor TR1 becomes disabled and thus the other transistor TR2 shuts off due to the low collector voltage.

A Schmitt-trigger has a hysteresis effect, and an output is opposite of an input in a Schmitt-trigger circuit, and it can be modified to operate just as a single-stable multi-vibrator. It is possible to obtain a circuit that generates clock signals. In such a circuit, when a NAND gate's input voltage is less than an upper limit voltage, an output stays as a high level signal, and if the input voltage reaches the upper limit voltage, the output voltage drops till it discharges to a lower limit voltage, and then the output voltage claims back on to high level again.

Therefore, the present invention allows a pin of the source voltage $V_{dd}$ to connect to a pin of the input voltage $V_i$ when the control voltage $V_c$ is high, or the pin of the source voltage $V_{dd}$ is connected to a pin of the filtered voltage $V_{OB}$ when the control voltage $V_c$ is low.

To summarize it, the source voltage $V_{dd}$ becomes the input voltage $V_i$ if the filtered voltage $V_{OB}$ is less than the input voltage $V_i$, or the source voltage $V_{dd}$ becomes the filtered voltage $V_{OB}$ if the filtered voltage $V_{OB}$ is greater than the input voltage $V_i$. Thus, the source voltage $V_{dd}$ can always be the highest voltage within the DC/DC converter. The voltage is used as a source voltage in generating the clock signals CK1 and CK2 in the clock generating unit (310), and it is applied to the bodies of the first and second switches M1 and M2 as well. Because the source voltage produced as above takes the value of either the input voltage $V_i$ or the filtered voltage $V_{OB}$, voltage of a high portion of the first clock CK1 and the second clock CK2 in the FIG. 7 is $V_{dd}$, and such voltage becomes the input voltage $V_i$ or a changing filtered voltage $V_{OB}$ as shown in the FIG. 7.

An output voltage adaptive voltage converter can be built according to the method stated so far, a source voltage of a clock generating unit switch connected to a filtered voltage when the filtered voltage is greater than an input voltage, or the source voltage is connected to the input voltage when the filtered voltage is less than the input voltage, and thus, makes it possible for transistors in a Buck-Boost DC converter to operate with a fixed voltage insuring a stable operation.

It is to be understood that the present invention does not have to be bounded by the realm of the specific examples stated in this patent but can be applied to various other areas without changing its technical characteristics or the major concepts. The present invention is further explained in the allowing claims that include every aspect of this invention and its technical characteristics.

The invention claimed is:

1. An output voltage adaptive voltage converting apparatus, comprising:

a clock generating unit that generates predetermined clock signals;

a switching amplifying unit that amplifies an input voltage ($V_i$) and produces an output voltage ($V_o$) based on the clock signals;

a feedback filtering unit that filters the output voltage ($V_o$) and produces a filtered voltage ($V_{OB}$);

a voltage comparing unit that compares the filtered voltage ($V_{OB}$) with the input voltage ($V_i$) and produces a control voltage ($V_c$); and a voltage switching unit that connects a source voltage ($V_{dd}$) of the clock generating unit to the input voltage ($V_i$) or the filtered voltage ($V_{OB}$) based on the control voltage ($V_c$).

2. The apparatus according to claim 1 further comprising:
a charge storing unit that stores charges of a voltage which is amplified by the switching amplifying unit; and
a leveling unit that levels out the output voltage ($V_o$) of the switching amplifying unit.

3. The apparatus according to claim 1, wherein the switching amplifying unit comprises a switch that turns on or off based on the clock signals.

4. The apparatus according to claim 3, wherein the switching amplifying unit comprises a first switch (M1) comprising a P-type MOSFET, a second switch (M2) comprising a P-type MOSFET, a third switch (M3) comprising a N-type MOSFET and a fourth switch (M4) comprising a N-type MOSFET, the charge storing unit is connected between the first switch (M1) and the second switch (M2), a source of the first switch (M1) is connected to the input voltage ($V_i$), a drain of the first switch (M1) is connected to both the drain of the third switch (M3) and one end of an inductor (L1) of the charge storing unit, a source and body of the third switch (M3) are connected to a ground ($V_{ss}$), a gate of the first switch (M1) and a gate of the third switch (M3) are connected to a first clock (CK1) of the clock generating unit, the other end of the inductor (L1) of the charge storing unit is connected to both a drain of the second switch (M2) and a drain of the fourth switch (M4), a source and body of the fourth switch (M4) are connected to the ground ($V_{ss}$), a source of the second switch (M2) is connected to both the output voltage ($V_o$) and one end of a capacitor (C1) of the leveling unit, the other end of the capacitor (C1) of the leveling unit is connected to the ground ($V_{ss}$), a body of the first switch (M1) and a body of the second switch are connected to the source voltage ($V_{dd}$), and a gate of the second switch (M2) and a gate of the fourth switch (M4) are connected to a second clock (CK2) of the clock generating unit.

5. The apparatus according to claim 1, wherein, if the filtered voltage ($V_{OB}$) is smaller than the input voltage ($V_i$), the voltage comparing unit produces a high level control voltage.

6. The apparatus according to claim 1, wherein, if the filtered voltage ($V_{OB}$) is greater than the input voltage ($V_i$), the voltage comparing unit produces a low level control voltage.

7. The apparatus according to claim 1, wherein the voltage switching unit connects the source voltage ($V_{dd}$) to the input voltage ($V_i$) when the control voltage ($V_c$) is a high level signal.

8. The apparatus according to claim 1, wherein the voltage switching unit connects the source voltage ($V_{dd}$) to the filtered voltage ($V_{OB}$) when the control voltage ($V_c$) is a low level signal.

9. The apparatus according to claim 4, wherein the first switch (M1) and the fourth switch (M4) are turned "ON", and the second switch (M2) and the third switch (M3) are turned "OFF" when the first clock signal (CK1) is a low level signal and the second clock signal (CK2) is a high level signal.

10. The apparatus according to claim 4, wherein the second switch (M2) and the third switch (M3) are turned "ON", and the first switch (M1) and the fourth switch (M4) are turned "OFF" when the first clock signal (CK1) is a high level signal and the second clock signal (CK2) is a low level signal.

11. An output voltage adaptive voltage converting method, comprising the steps of:
(a) applying, by a clock generation unit, the first clock signal (CK1) and the second clock signal (CK2) to a switching amplifying unit;
(b) amplifying, by the switching amplifying unit, an input voltage ($V_i$) and producing a output voltage ($V_o$) based on the first clock signal (CK1) and the second clock signal (CK2);
(c) filtering, by a feedback filtering unit, the output voltage ($V_o$) and producing a filtered voltage ($V_{OB}$);
(d) comparing, by a voltage comparing unit, the filtered voltage ($V_{OB}$) with the input voltage ($V_i$) and producing a control voltage ($V_c$); and
(e) connecting, by a voltage switching unit, a source voltage ($V_{dd}$) of the clock generating unit to the input voltage ($V_i$) or the filtered voltage ($V_{OB}$) based on the control voltage ($V_c$).

12. The method according to claim 11, wherein, at the step (d), if the filtered voltage ($V_{OB}$) is smaller than the input voltage ($V_i$), the voltage comparing unit produces a high level control voltage.

13. The method according to claim 11, wherein, at the step (d), if the filtered voltage ($V_{OB}$) is greater than the input voltage ($V_i$), the voltage comparing unit produces a low level control voltage.

14. The method according to claim 11, wherein, at the step (e), the voltage switching unit connects the source voltage ($V_{dd}$) to the input voltage ($V_i$) when the control voltage ($V_c$) is a high level signal.

15. The method according to claim 11, wherein, at the step (e), the voltage switching unit connects the source voltage ($V_{dd}$) to the filtered voltage ($V_{OB}$) when the control voltage ($V_c$) is a low level signal.

16. The method according to claim 11, wherein a first switch (M1) and a fourth switch (M4) of the switching amplifying unit are turned "ON", and a second switch (M2) and a third switch (M3) of the switching amplifying unit are turned "OFF", when the first clock signal (CK1) is a low level signal and the second clock signal (CK2) is a high level signal.

17. The method according to claim 11, wherein a second switch (M2) and a third switch (M3) of the switching amplifying unit are turned "ON", and a first switch (M1) and a fourth switch (M4) of the switching amplifying unit are turned "OFF", when the first clock signal (CK1) is a high level signal and the second clock signal (CK2) is a low level signal.

\* \* \* \* \*